United States Patent
Chong et al.

(10) Patent No.: US 6,590,946 B1
(45) Date of Patent: Jul. 8, 2003

(54) METHOD AND APPARATUS FOR TIME-WARPING A DIGITIZED WAVEFORM TO HAVE AN APPROXIMATELY FIXED PERIOD

(75) Inventors: Nicola Raewyn Chong, Fairy Meadow (AU); Ian Shaw Burnett, Figtree (AU)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/490,607

(22) Filed: Jan. 25, 2000

(30) Foreign Application Priority Data

Jan. 27, 1999 (AU) ............................................. PP8298

(51) Int. Cl.[7] ........................... H04L 27/06; H04B 14/04

(52) U.S. Cl. ........................................ 375/340; 375/242

(58) Field of Search ................................. 375/340, 254, 375/242, 240; 704/200, 214, 219, 220

(56) References Cited

U.S. PATENT DOCUMENTS 5,617,507 A * 4/1997 Lee et al. .................... 704/200

OTHER PUBLICATIONS

Michael A. Ramalho et al., "New Speech Enhancment Techniques Using the Pitch mode Modulation Model," IEEE, 1993, pp 1531–1534.*

* cited by examiner

*Primary Examiner*—Tesfaldet Bocure
(74) *Attorney, Agent, or Firm*—Kenneth A. Haas

(57) ABSTRACT

An input sequence of unwarped signal samples is stored in an input buffer (101). A pitch and voicing analysis unit (103), which analyzes voicing classification data from the input buffer (101), provides a voicing classification variable indicating whether the voicing classification data is voiced or unvoiced and a preliminary estimate of the signal period in the interval spanned by the voicing classification data to a pitch pulse detection unit (104). The pitch pulse detection unit (104), also using analysis frame data from the input buffer (101), provides a set of locations of unwarped pitch pulses contained in the interval spanned by the analysis frame data to a mapping optimization unit (105). The mapping optimization unit (105) provides a set of parameters describing a mapping from an unwarped time-scale to a warped time-scale, to a warped sampling instant calculation unit (106). The warped sampling instant calculation unit (106) provides a set of warped sampling instants to a warped sample value calculation unit (107). The analysis frame data is also conveyed from the input buffer (101) to the warped sample value calculation unit (107), which provides a set of warped signal samples to an output buffer (108).

9 Claims, 3 Drawing Sheets

METHOD AND APPARATUS FOR TIME-WARPING A DIGITIZED WAVEFORM TO HAVE AN APPROXIMATELY FIXED PERIOD

FIELD OF THE INVENTION

This invention relates to a method and apparatus for time-warping a digitized waveform to have an approximately fixed period, especially, though not exclusively, so as to improve the performance of a class of methods used for compressing digitized speech data for storage or for transmission over digital communication channels.

BACKGROUND OF THE INVENTION

Speech waveforms are comprised of two primary signal types, described respectively as voiced and unvoiced. Voiced signals exhibit a relatively high degree of periodicity (i.e. they have a repetitive pattern), while unvoiced signals are not periodic. The high degree of periodicity of voiced speech implies that at a given time instant, t, the amplitude of the waveform is approximately equal to the amplitude at some earlier instant, (t−T), where T, termed the period of the signal, is a continuous function of time. The greater the degree of periodicity, the greater the similarity between the signal amplitudes at t and (t−T). Varying degrees of periodicity between the extremes of purely voiced or purely unvoiced data are also possible.

In systems for storing or transmitting speech, it is common to represent a speech signal in digitized form, i.e. as a sequence of numerical values, termed samples, which represent the amplitude of the signal at discrete points on a continuous time-scale, these points being termed sampling instants. It is well known that provided the sampling instants are separated by a sufficiently small interval in time related to the maximum frequency component in the signal, the original signal at any instant on the continuous time-scale can be computed from the signal samples.

In some techniques used for compressing digitized speech data, it is usual to apply to a digitized speech signal a filter, which may be time varying, and whose effects include reducing fluctuations of the signal's spectral envelope with respect to time, and increasing the spectral flatness of the signal. For voiced speech, increasing the spectral flatness of the signal usually causes it to exhibit strong peaks once per period. These peaks are known as pitch pulses.

It is also usual in some methods of speech data compression to extract from a digitized speech signal, either after or without the filtering mentioned above, segments of data, each segment containing a finite number of signal samples, corresponding to an interval in time that is a fixed multiple of the signal period. In many systems, the set of signal samples contained in each segment is transformed into another set of data values, having properties that are more advantageous for encoding the signal. Such methods are described, for example, in "Waveform interpolation for speech coding and synthesis," by W. B. Kleijn and J. Haagen, in *Speech Coding and Synthesis* edited by W. B. Kleijn and K. K. Paliwal (Elsevier Science Publishers, 1995). In some methods of this kind, consecutive extracted segments begin with samples corresponding to points in time separated by one period. Such methods are described, for example, in "Waveform interpolation with pitch-spaced subbands," by W. B. Kleijn, H. Yang and E. Deprettere, in *Proc. 5th Int. Conf on Spoken Language Processing*, 1998.

For the purposes of encoding the set of data values arising from each extracted segment, either after or without applying the transformations mentioned above, it is desirable for the set of data values to have the same length (the same number of data values). However since each extracted segment corresponds to an interval in time that is a fixed multiple of the signal period, and since the period varies with time, this would not be true of segments extracted from the signal directly. However it can be achieved if the signal is first time-warped so that the period is constant. Time-warping involves creating an invertible mapping that allows any instant on the original continuous time-scale, denoted t, to be associated with a point on another continuous time-scale, denoted t'. Based on this mapping it is desired to determine a set of signal values, termed warped signal samples, which are the amplitudes of the signal at time instants that correspond to points on the new time-scale separated by some constant interval.

Since, in general, the warped signal samples correspond to time instants that are different from the original sampling instants, computation of the warped signal samples involves interpolating between the samples of the original digitized signal. In principal, an objective of this process is to produce a new resampled signal with a property that some fixed interval on the new time scale, denoted T', always corresponds to an interval of one period, as measured on the original time scale.

The objective of producing a warped signal with a fixed period is difficult to achieve precisely. However, a warping that produces an approximately constant period can be satisfactory.

BRIEF SUMMARY OF THE INVENTION

The present invention therefore seeks to provide a method and apparatus for generating a set of warped signal samples from a set of unwarped signal samples, preferably, such that the number of warped signal samples spanning an interval equal to the signal period is approximately constant.

Accordingly, in one aspect, the invention provides a method of generating a set of warped signal samples, the method comprising the steps of:

receiving a sequence of unwarped signal samples, wherein the unwarped signal samples represent the amplitudes of a continuous input signal measured at unwarped sampling instants, wherein the unwarped sampling instants are discrete points on a continuous unwarped time-scale, and wherein the sequence includes at least as many unwarped signal samples as exist in an interval of time equal to the expected maximum value of signal period, wherein signal period is a slowly varying function of time such that the amplitude of a signal at a first point in time is approximately equal to the amplitude at a second point displaced from the first point by an interval equal to the signal period at the first point;

storing the received sequence in a buffer;

determining unwarped pitch pulse locations within an interval spanned by a particular analysis frame, wherein pitch pulses are strong peaks occurring once per period in the input signal, unwarped pitch pulse locations are points on the unwarped time-scale at which pitch pulses occur, and an analysis frame is a predetermined segment of samples in the buffer;

determining an invertible mapping that associates all points within an interval on the continuous unwarped time-scale spanned by the analysis frame with corresponding points on a continuous warped time-scale, such that the mapping can be completely described by a finite number of parameters, and such that if pitch pulses occur within the interval, the mapping minimizes a measure of deviation between warped pitch pulse locations and a predetermined set of desired warped pitch pulse locations, wherein warped pitch pulse locations are points on the warped scale with which the mapping associates the unwarped pitch pulse locations;

determining warped sampling instants, wherein warped sampling instants are points on the original time-scale that are within the time interval spanned by the analysis frame, and which correspond to predefined points on the warped scale; and interpolating between the unwarped signal samples to compute a set of warped signal samples, wherein the warped signal samples are the values of the continuous input signal at the warped sampling instants.

In one preferred embodiment, the mapping between the unwarped and warped time-scales is such that points on the unwarped scale separated by one period are associated with points on the warped scale that are separated approximately by a warped period, wherein the warped period is a predetermined fixed interval. Further, in a preferred embodiment, the desired warped pitch pulse locations are points on the warped time-scale that are separated by exactly one warped period. Preferably, some quantity of previously received unwarped signal samples are also stored in the buffer.

According to a second aspect, the invention provides an apparatus for generating a set of warped signal samples, the apparatus comprising:

an input terminal for receiving a sequence of unwarped signal samples, wherein the unwarped signal samples represent the amplitudes of a continuous input signal measured at unwarped sampling instants, wherein the unwarped sampling instants are discrete points on a continuous unwarped time-scale, and wherein the sequence includes as many unwarped signal samples as exist in an interval of time equal to the expected maximum value of signal period, wherein signal period is a slowly varying function of time such that the amplitude of a signal at a first point in time is approximately equal to the amplitude at a second point displaced from the first point by an interval equal to the signal period at the first point;

a buffer in which the received sequence is stored;

a first analyzer coupled to the buffer to analyze the data within the buffer and to determine unwarped pitch pulse locations within an interval spanned by an analysis frame, wherein pitch pulses are strong peaks occurring once per period in the input signal, unwarped pitch pulse locations are points on the unwarped time-scale at which pitch pulses occur, and an analysis frame is a predetermined segment of samples in the buffer;

a second analyzer to analyze the unwarped pitch pulse locations and to determine an invertible mapping that associates all points within an interval on the continuous unwarped time-scale spanned by the analysis frame with corresponding points on a continuous warped time-scale, such that the mapping can be completely described by a finite number of parameters, and such that if pitch pulses occur within the interval, the mapping minimizes a measure of deviation between warped pitch pulse locations and a predetermined set of desired warped pitch pulse locations, wherein warped pitch pulse locations are points on the warped scale with which the mapping associates the unwarped pitch pulse locations;

a third analyzer to analyze the parameters of the mapping and to determine warped sampling instants, wherein warped sampling instants are points on the original time-scale that are within the time interval spanned by the analysis frame, and which correspond to predetermined points on the warped time-scale; and an interpolator for interpolating between the unwarped signal samples to compute a set of warped signal samples, wherein the warped signal samples are the values of the continuous input signal at the warped sampling instants.

Preferably, the desired warped pitch pulse locations are separated by a fixed interval on the warped scale. Preferably, also, the predetermined points on the warped scale, corresponding to the warped sampling instants on the original time-scale, are separated by a fixed interval on the warped scale equal to the separation between adjacent pitch pulse locations divided by an integer. The buffer preferably also stores some quantity of previously received unwarped signal samples.

Thus, in one preferred embodiment, the invention provides a method for generating a set of warped signal samples, in which, during intervals of speech that are approximately periodic, consecutive contiguous subsets of warped signal samples, each subset spanning an interval of one period contain a fixed number of samples, and wherein a sample in each subset corresponding to a pitch pulse is synchronized to occur at an approximately fixed location relative to other samples of the subset, wherein the location of a sample corresponding to a pitch pulse is such that samples at boundaries of the subset are of low amplitude in comparison with the amplitude of the pitch pulse.

BRIEF DESCRIPTION OF THE DRAWINGS

An embodiment of the invention will now be more fully described, by way of example, with reference to the drawings, of which.

DETAILED DESCRIPTION OF THE DRAWINGS

Figure 1:
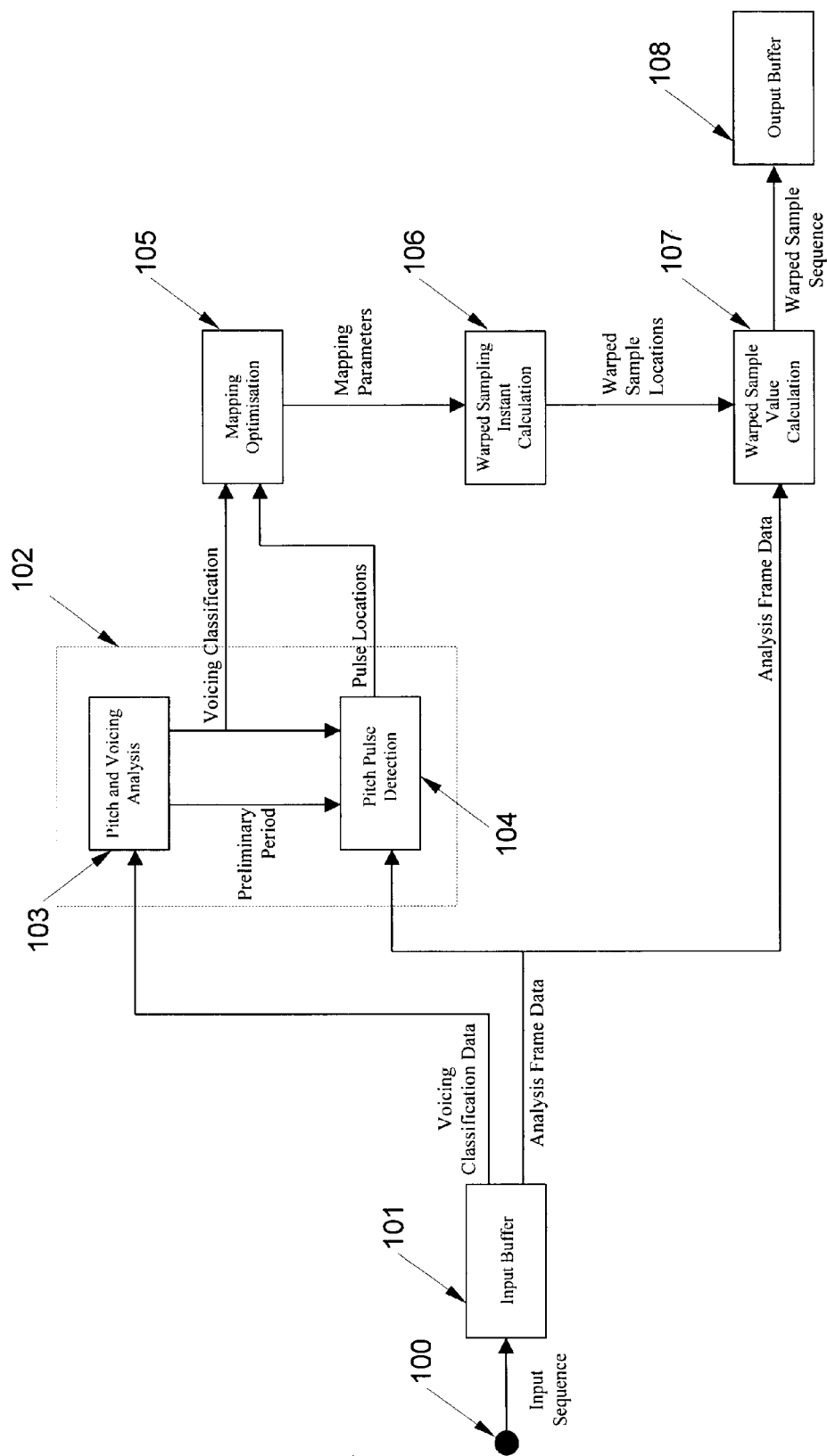
FIG. 1 shows a block diagram of an apparatus used to generate a warped signal.

Thus, as shown in FIG. 1, an input sequence of unwarped signal samples is delivered from an input terminal 100 to an input buffer 101. The input buffer 101 provides to a first analyzer 102 two potentially, but not necessarily, different subsets of data. The first analyzer comprises a pitch and voicing analysis unit 103 and a pitch pulse detection unit 104. One subset of data provided to the first analyzer 102 by the input buffer is termed the voicing classification data, and is applied to the pitch and voicing analysis unit 103. A second subset of data conveyed to the first analyzer 102 from the input buffer 101 is termed the analysis frame, and is applied to the pitch pulse detection unit 104. The pitch and voicing analysis unit 103 provides to the pitch pulse detection unit 104 a binary voicing classification variable indicating whether the voicing classification data is voiced or unvoiced. The pitch and voicing analysis unit 103 also provides the voicing classification variable to a second analyzer comprising a mapping optimization unit 105. In cases where the voicing classification data is voiced, the pitch and voicing analysis unit 103 provides a preliminary estimate of the signal period in the interval spanned by the voicing classification data to the pitch pulse detection unit 104. The pitch pulse detection unit delivers to the mapping optimization unit 105 a set of locations of unwarped pitch pulses contained in the interval spanned by the analysis frame data. The mapping optimization unit 105 provides to a third analyzer a set of parameters describing a mapping from an unwarped time-scale to a warped time-scale, wherein the third analyzer comprises a warped sampling instant calculation unit 106. The warped sampling instant calculation unit 106 provides to an interpolator a set of warped sampling instants, wherein the interpolator comprises a warped sample value calculation unit 107. The analysis frame data is also conveyed from the input buffer 101 to the warped sample value calculation unit 107, which provides a set of warped signal samples to an output buffer 108.

Each sequence of samples received at the input terminal 100 is fixed in length, although in general this is not essential. Further, the analysis frame would usually be chosen so that it has the same length as the received sequence, but ends at some earlier point in time, although, again, this is not essential. In general, the analysis frame, would be expected to begin at the unwarped signal sample immediately following the most recently computed warped signal sample, in order to ensure that warping proceeds continuously, from one received sequence to the next.

Figure 2:
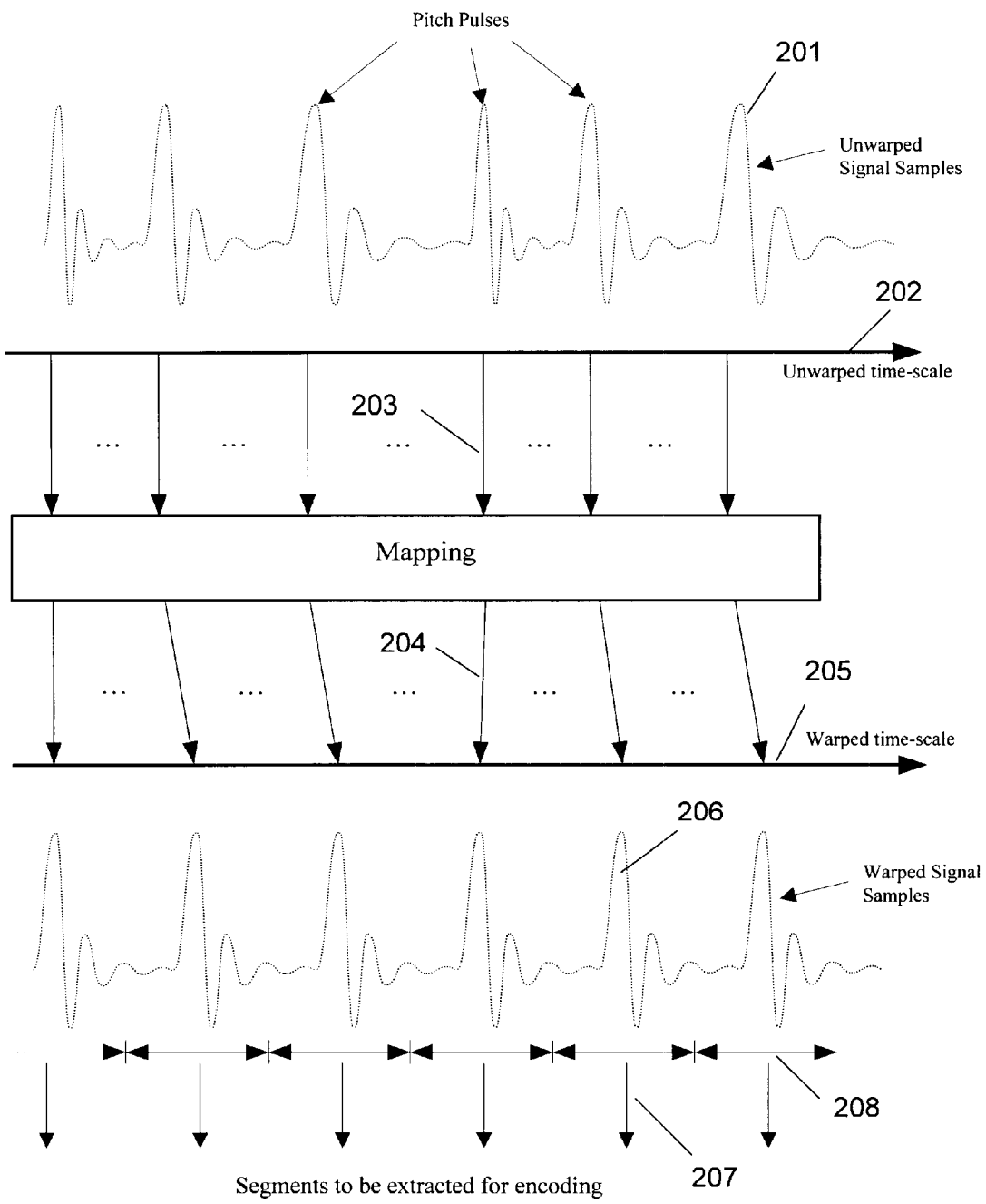
FIG. 2 shows diagrammatically the relationship between warped and unwarped signal samples.

The purpose of the mapping in a preferred embodiment is illustrated by FIG. 2. The unwarped signal samples, illustrated as waveform 201, are defined on an unwarped time-scale 202, and the period of the signal on this time-scale is generally variable. The mapping associates each point 203 on the unwarped time-scale with a point 204 on a warped time-scale 205 in such a way that an interval of one period on the unwarped time-scale corresponds to an approximately constant interval on the warped time-scale. The consequence of this is that if segments of warped signal samples, illustrated as waveform 206, corresponding to one period are extracted for subsequent encoding, these segments will each have the same number of samples. In other words, the time-scale is effectively normalized so that the period of the signal is constant. Moreover, the samples 207 corresponding to the pitch pulses in each period 208 are effectively synchronized with the period, so that they appear in approximately the same location relative to the other samples in each consecutive period. In practice, one of the benefits of this approach is that consecutive and contiguous subsets of warped signal samples corresponding to the signal period may be extracted such that the amplitudes of the samples at the boundaries of each subset are small relative to the amplitude of the pitch pulses.

The objective for the mapping is to minimize a measure of deviation between the warped pitch pulse locations and a predetermined set of desired warped pitch pulse locations. In a preferred embodiment, the desired warped pitch pulse locations are chosen to be separated from some predefined point on the warped time-scale by integer multiples of T'. The effect of this is that if contiguous segments of warped signal samples corresponding to an interval of one period are extracted, pitch pulses will occur in approximately the same location relative to each segment.

One way to describe the mapping is to assume that the interval on the warped time-scale corresponding to the interval between two arbitrary points, $t_a$ and $t_b$, on the unwarped time-scale can be expressed by:

$$\Delta t'(t_a, t_b) = T' \int_{t_a}^{t_b} f(t) dt$$

where $f(t)$ is termed the pitch track of the signal. If $f(t)$ is known, and $t_a$ is a point on the unwarped scale for which a corresponding point on the warped time-scale is already known, this expression enables a point on the warped time-scale corresponding to $t_b$ to be computed. Finding a mapping to satisfy the design objective is therefore equivalent to finding an appropriate pitch track. The pitch track must be assumed to be well represented in the interval corresponding to the analysis frame by some deterministic function that depends on one or more parameters. These parameters define the track for that particular frame.

In a preferred embodiment, the pitch track has a different functional form for voiced and unvoiced parts of a frame. Within an unvoiced part of the frame the function has an arbitrary predefined value or values. Within a voiced part of a frame, the function is such that the reciprocal of the pitch changes linearly. That is, during the voiced part of the frame, $$f(t) = [B(t - t_a) + C]^{-1},$$

where $t_a$ is the start of the voiced segment, and e reciprocal of the pitch at $t_a$. It is necessary, therefore to identify which parts of the analysis frame are voiced and unvoiced. Standard methods of voicing classification and period estimation may be employed, such as those described in Discrete-time Processing of Speech Signals by J. R. Deller, Jr, J. G. Proakis and J. H. L. Hansen (Macmillan Publishing Co. New York, 1993). Although a voicing classification is required for all samples in the entire frame, in practice the interval over which an individual classification decision is made may not necessarily coincide with the frame. For example, classification may be performed over an interval the same length as the frame but displaced in time, or over several separate but contiguous intervals. In all cases, it is only necessary that the intervals within which the classification is performed, together with intervals within which classification has previously been performed, be contiguous and span the entire frame.

Figure 3:
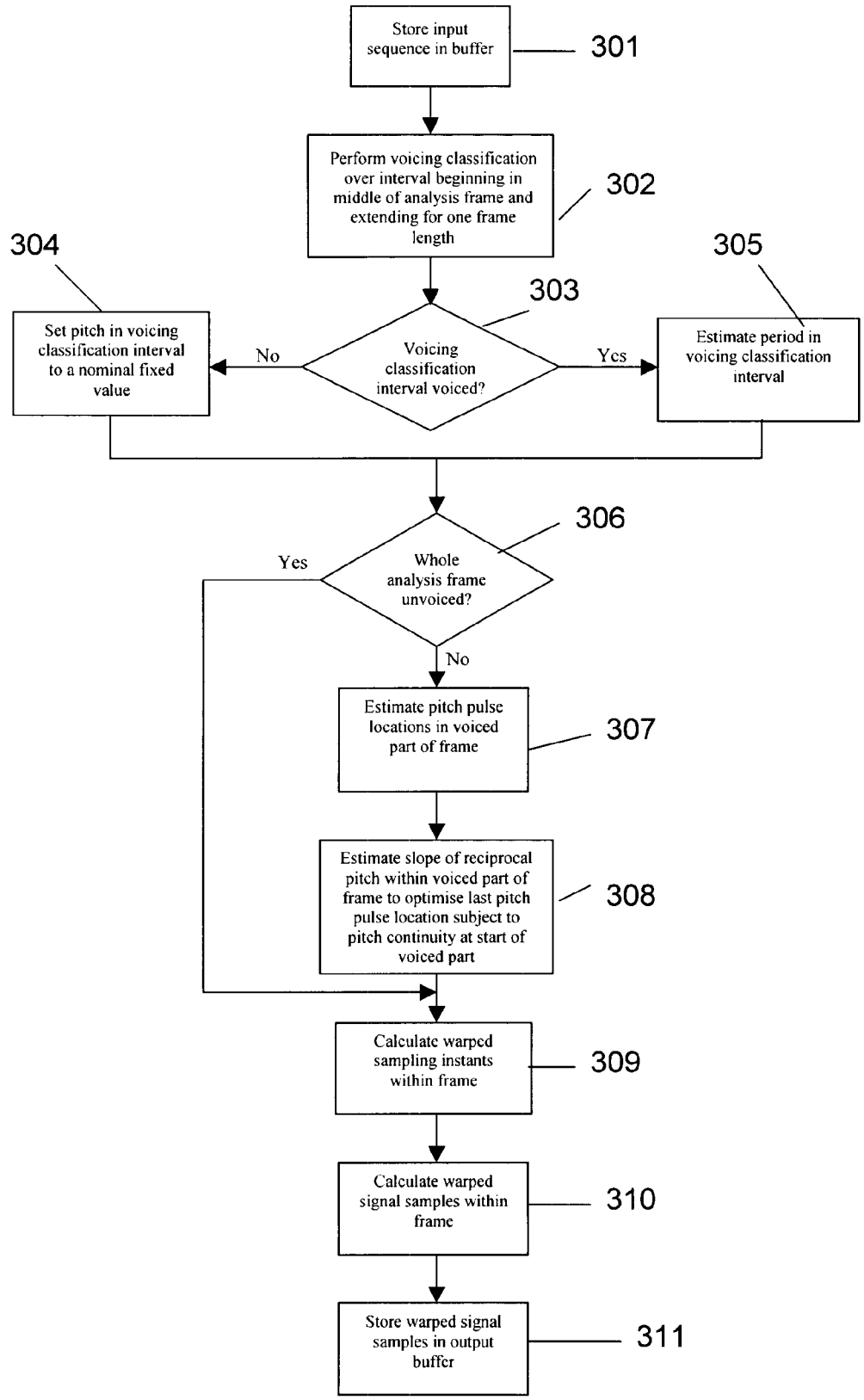
FIG. 3 shows a flowchart of a method for generating a set of warped signal samples utilizing the apparatus illustrated in FIG. 1.

As illustrated in FIG. 3, in a preferred embodiment, after storing the input sequence 301, each voicing classification is performed over an interval with the same length as the frame but beginning in the middle of the frame 302. The effect is that within a given frame, separate classifications apply to the first and second halves of the frame.

Once the data in the voicing classification interval has been classified as voiced or unvoiced 303, if the data is unvoiced, the pitch track in that interval is set to some nominal value 304. If the interval is voiced, a preliminary estimate of the signal period is made 305. This is required later to determine the unwarped pitch pulse locations. Standard methods of period estimation may be employed, such as those described in *Discrete-time Processing of Speech Signals* by J. R. Deller, Jr, J. G. Proakis and J. H. L. Hansen (Macmillan Publishing Co. New York, 1993).

In some circumstances it may be desirable to impose constraints on the pitch track to ensure continuity of the function or its derivatives within a frame or from one frame to another. For example, in a preferred embodiment, if the current frame begins in an interval classified as voiced, then the function representing the pitch track may be constrained so that the pitch at the beginning of the frame is the same as the pitch at the end of the previously analysed frame. If the current frame begins in an interval classified as unvoiced and ends in an interval that is voiced, then the function representing the pitch track may be constrained so that the pitch is constant during the unvoiced segment and has the same value at the beginning of the voiced segment as at the end of the unvoiced segment.

If the pitch is constrained at the beginning of any voiced segment to ensure continuity, then in this case the pitch track for the frame is controlled by only one free parameter, which is the slope of the period variation within the voiced segment. Once voiced parts of an analysis frame, and the approximate period in those intervals, are known, the pitch track in the voiced intervals can be determined. In the preferred embodiment, if the frame contains a voiced part 306, unwarped pitch pulse locations within the interval spanned by the voiced part are first determined 307. These locations correspond to samples within the voiced regions that have the greatest signal amplitude within an interval of approximately one period, and can be found, for example, by a direct search of the samples within the frame.

Once the unwarped pitch pulse locations in the analysis frame are known, parameters representing the mapping between the unwarped and warped time-scales can be determined. The free parameters that define the pitch track within the frame are calculated so as to minimize a measure of deviation between the warped pitch pulse locations and a predetermined set of desired warped pitch pulse locations. That is, the function to be minimized, termed the performance function, should be defined such that provided the warped pitch pulse locations lie sufficiently close to the desired warped pitch pulse locations:

- an increase in the magnitude of the difference between at least one warped pitch pulse location and a corresponding desired warped pitch pulse location causes an increase in the performance function;
- an increase in the magnitude of the difference between any warped pitch pulse location and a corresponding desired warped pitch pulse location causes no decrease in the performance function.

In a preferred embodiment, the performance function is the magnitude of the difference between the warped pitch pulse location corresponding to the last pitch pulse in the interval spanned by the analysis frame and the corresponding desired warped pitch pulse location. In the case where the pitch track has only one parameter, the minimum value of this performance function may be determined to a sufficient degree of accuracy by a direct search of a set of potential parameter values. This involves computing the final warped pitch pulse location in the frame based on pitch tracks corresponding to each possible parameter value. To determine the warped pitch pulse locations it is necessary to compute the interval on the warped time-scale corresponding to the interval on the unwarped time-scale from a previously computed warped signal sample to the unwarped pitch pulse location. This interval may include both unvoiced and voiced parts. If the pitch track is assumed to be constant during unvoiced speech, then an interval on the warped scale between two instants $t_a$ and $t_b$ within an unvoiced part of the signal is:

$$\Delta t'(t_a, t_b) = T' \int_{t_a}^{t_b} f(t) dt$$

$$= T' f_{uv}(t_b - t_a)$$

where $f_{uv}$ is the pitch during unvoiced speech. If the reciprocal of pitch is assumed to vary linearly during voiced speech, then an interval on the warped scale between two instants $t_a$ and $t_b$ within a voiced part of the signal is:

$$\Delta t'(t_a, t_b) = T' \int_{t_a}^{t_b} f(t) dt$$

$$= T' \int_{t_a}^{t_b} [c + B(t - t_a)]^{-1} dt$$

$$= \frac{T'}{B} [\ln((t_b - t_a) + c/B) - \ln(c/B)].$$

In general, the performance function may depend on more warped pitch pulse locations than the number of parameters to be estimated, and in such cases the minimum value of the performance function will be non-zero. In such cases the parameters may be estimated by any standard optimization technique such as those described in *Practical Optimization* by P. E. Gill, W. Murray and M. H. Wright (Academic Press, London, 1980). Thus, the slope of reciprocal pitch within the voiced part of the frame is estimated 308 to optimize the last pitch pulse location subject to pitch continuity at the start of the voiced part of the frame.

Once the pitch track, and hence the mapping between the unwarped and warped time-scales, has been determined, the warped sampling instants 309 and warped signal samples 310 may be computed. The locations of the warped signal samples on the original time scale are calculated based on the estimated pitch track. In the preferred embodiment, if $t_0$ is an instant on the original time-scale corresponding to some sample on the warped time scale that has already been calculated, then subsequent samples on the warped time-scale correspond to points $t_1$, $t_2$, $t_3$, etc on the unwarped time-scale, such that:

$$\Delta t'(t_0, t_i) = T' \int_{t_0}^{t_i} f(t) dt = \frac{iT'}{L}$$

where i is an integer and L is a predefined constant. If the interval from $t_0$ to $t_i$ is unvoiced and the pitch is assumed constant within the interval, then it follows that $$t_i = t_0 + \frac{i}{L f_{uv}}.$$

If the interval from $t_0$ to $t_i$ is voiced, and the reciprocal of pitch is assumed to vary linearly within the interval, then $$t_i = t_0 - c/B + \exp[Bi/L + \ln(c/B)].$$

Once the locations of the warped sample instants on the original time-scale are determined, the signal values at those warped sample instants can be approximated 310 by any standard interpolation technique, for example by computing a linear combination of adjacent samples of the original digitized signal weighted by a sinc function as discussed in *Digital Signal Processing, Principles Algorithms and Applications*, $2^{nd}$ Ed., by J. G. Proakis and D. G. Manolakis (Macmillan Publishing Co. New York, 1992). Once the warped signal samples have been computed, they are provided 311 to an output buffer.

It will be appreciated that although only one particular embodiment has been described here in detail, various modifications and improvements can be made by a person skilled in the art without departing from the scope of the present invention.

What we claim is:

1. A method of generating a set of warped signal samples, the method comprising the steps of:

receiving a sequence of unwarped signal samples, wherein the unwarped signal samples represent the amplitudes of a continuous input signal measured at unwarped sampling instants, wherein the unwarped sampling instants are discrete points on a continuous unwarped time-scale, and wherein the sequence includes at least as many unwarped signal samples as exist in an interval of time equal to the expected maximum value of signal period, wherein signal period is a slowly varying function of time such that the amplitude of a signal at a first point in time is approximately equal to the amplitude at a second point displaced from the first point by an interval equal to the signal period at the first point;

storing the received sequence in a buffer;

determining unwarped pitch pulse locations within an interval spanned by a particular analysis frame, wherein pitch pulses are strong peaks occurring once per period in the input signal, unwarped pitch pulse locations are points on the unwarped time-scale at which pitch pulses occur, and an analysis frame is a predetermined segment of samples in the buffer;

determining an invertible mapping that associates all points within an interval on the continuous unwarped time-scale spanned by the analysis frame with corresponding points on a continuous warped time-scale, such that the mapping can be completely described by a finite number of parameters, and such that if pitch pulses occur within the interval, the mapping minimizes a measure of deviation between warped pitch pulse locations and a predetermined set of desired warped pitch pulse locations, wherein warped pitch pulse locations are points on the warped scale with which the mapping associates the unwarped pitch pulse locations;

determining warped sampling instants, wherein warped sampling instants are points on the original time-scale that are within the time interval spanned by the analysis frame, and which correspond to predefined points on the warped scale; and interpolating between the unwarped signal samples to compute a set of warped signal samples, wherein the warped signal samples are the values of the continuous input signal at the warped sampling instants.

2. A method of generating a set of warped signal samples according to claim 1, wherein the mapping between the unwarped and warped time-scales is such that points on the unwarped scale separated by one period are associated with points on the warped scale that are separated approximately by a warped period, wherein the warped period is a predetermined fixed interval.

3. A method of generating a set of warped signal samples according to claim 2, wherein the desired warped pitch pulse locations are points on the warped time-scale that are separated by exactly one warped period.

4. A method of generating a set of warped signal samples according to claim 1, wherein some quantity of previously received unwarped signal samples are also stored in the buffer.

5. An apparatus for generating a set of warped signal samples, the apparatus comprising:

an input terminal for receiving a sequence of unwarped signal samples, wherein the unwarped signal samples represent the amplitudes of a continuous input signal measured at unwarped sampling instants, wherein the unwarped sampling instants are discrete points on a continuous unwarped time-scale, and wherein the sequence includes as many unwarped signal samples as exist in an interval of time equal to the expected maximum value of signal period, wherein signal period is a slowly varying function of time such that the amplitude of a signal at a first point in time is approximately equal to the amplitude at a second point displaced from the first point by an interval equal to the signal period at the first point;

a buffer having an input coupled to the input terminal for storing the received sequence of unwarped signal samples;

a first analyzer coupled to the buffer to analyze the data within the buffer and to determine unwarped pitch pulse locations within an interval spanned by an analysis frame, wherein pitch pulses are strong peaks occurring once per period in the input signal, unwarped pitch pulse locations are points on the unwarped time-scale at which pitch pulses occur, and an analysis frame is a predetermined segment of samples in the buffer;

a second analyzer coupled to the first analyzer to analyze the unwarped pitch pulse locations and to determine an invertible mapping that associates all points within an interval on the continuous unwarped time-scale spanned by the analysis frame with corresponding points on a continuous warped time-scale, such that the mapping can be completely described by a finite number of parameters, and such that if pitch pulses occur within the interval, the mapping minimizes a measure of deviation between warped pitch pulse locations and a predetermined set of desired warped pitch pulse locations, wherein warped pitch pulse locations are points on the warped scale with which the mapping associates the unwarped pitch pulse locations;

a third analyzer coupled to the second analyzer to analyze the parameters of the mapping and to determine warped sampling instants, wherein warped sampling instants are points on the original time-scale that are within the time interval spanned by the analysis frame, and which correspond to predetermined points on the warped time-scale; and an interpolator coupled to the third analyzer for interpolating between the unwarped signal samples to compute a set of warped signal samples, wherein the warped signal samples are the values of the continuous input signal at the warped sampling instants.

6. An apparatus for generating a set of warped signal samples according to claim 5, wherein the first analyzer comprises a pitch and voicing analysis unit having a first input coupled to a first output of the input buffer for receiving voicing classification data, and a pitch pulse detection unit having an input coupled to a second output of the input buffer for receiving frame data, the pitch and voicing analysis unit providing preliminary period information and voicing classification information to the pitch pulse detection unit.

7. An apparatus for generating a set of warped signal samples according to claim 6, wherein the second analyzer comprises a mapping optimization unit having a first input coupled to the pitch and voicing analysis unit for receiving the voicing classification information and a second input coupled to the pitch pulse detection unit for receiving pulse location information.

8. An apparatus for generating a set of warped signal samples according to claim 7, wherein the third analyzer comprises a warped sampling instant calculation unit having an input coupled to the mapping optimization unit for receiving the set of mapping parameters and determining the warped sampling instants therefrom.

9. An apparatus for generating a set of warped signal samples according to claim 8, wherein the interpolator comprises a warped sample value calculation unit having a first input coupled to the warped sampling instant calculation unit and a second input coupled to the input buffer for receiving the frame data, the warped sample value calculation unit calculating values of the warped signal samples.

\* \* \* \* \*